June 26, 1934.  E. V. COLLINS  1,964,559
THREE-ROW CULTIVATOR ATTACHMENT FOR TRACTORS
Filed Feb. 16, 1931  4 Sheets-Sheet 1

Inventor
Edgar V. Collins
by Orwig & Hague Attys.

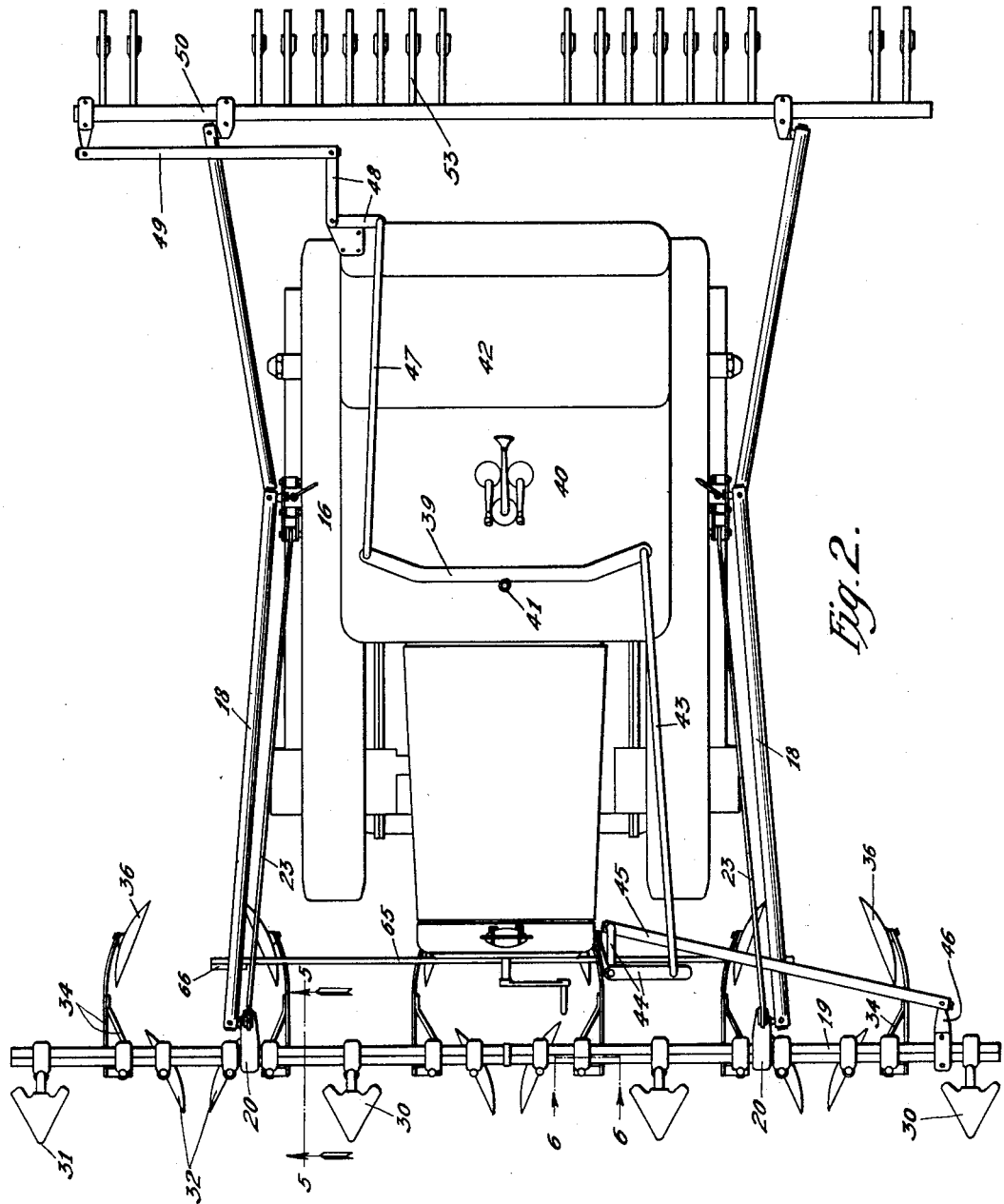

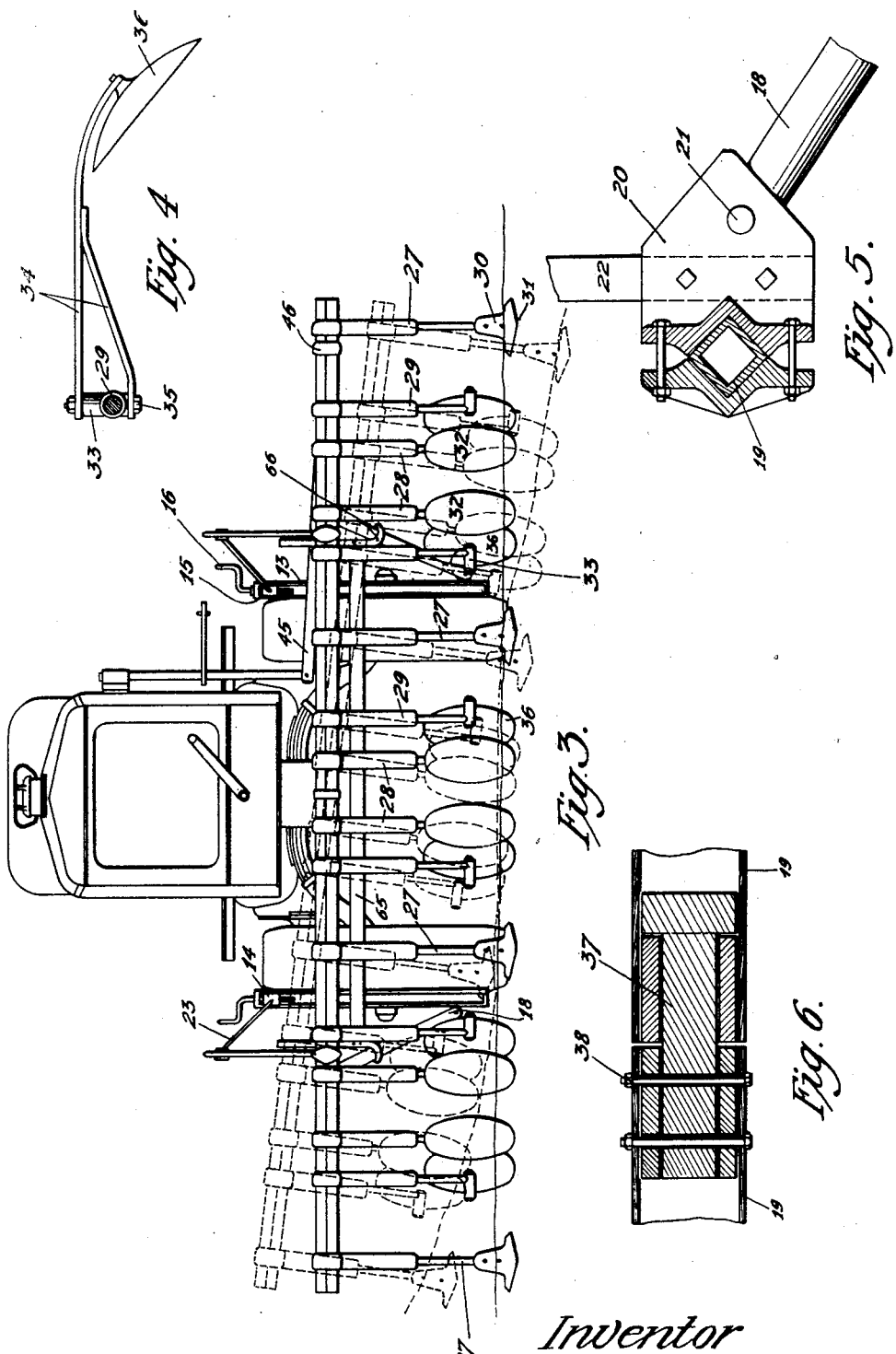

June 26, 1934.  E. V. COLLINS  1,964,559
THREE-ROW CULTIVATOR ATTACHMENT FOR TRACTORS
Filed Feb. 16, 1931  4 Sheets-Sheet 4

Inventor
Edgar V Collins
by Orwig & Hague Attys.

Patented June 26, 1934

1,964,559

UNITED STATES PATENT OFFICE 1,964,559

THREE-ROW CULTIVATOR ATTACHMENT FOR TRACTORS

Edgar V. Collins, Ames, Iowa

Application February 16, 1931, Serial No. 516,027

12 Claims. (Cl. 97—47)

The object of my invention is to provide a cultivator attachment, which may be easily applied to the ordinary farm tractor, and which is of durable construction and light weight, and at the same time capable of automatically maintaining its shovels at a comparatively constant depth regardless of whether or not the shovels are operating in ridges higher than the wheel base surface, or in dead furrows or ditches lower than the said wheel base surface, without the use of springs for holding the shovels in the ground when hard soil is encountered, and without the use of gauge runners or wheels to prevent the shovels from entering soft soil at too great a depth.

A further object of my invention is to provide in a cultivator attachment for tractors, including a laterally movable shovel supporting bar adapted to be attached to one end of the tractor, means for counter-balancing the swinging movement of said shovel supporting bar, whereby when a tractor and the shovel supporting bar carried thereby are operated on a hillside, any tendency of the shovel supporting bar to move downwardly of the hill will be counter-balanced.

A further object is to provide in a tractor having a cultivator supporting bar carried by the front end of the tractor and adapted to swing laterally of the line of advance of the tractor, and provided with a second cultivator attachment secured to the rear of the tractor and also adapted to swing laterally, improved means for operatively connecting the forward and rear cultivator members, whereby swinging movement of the front cultivator member in one direction will cause the rear cultivator member to be swung in the opposite direction, for counterbalancing the said cultivator bars against lateral swinging movement and at the same time provide means whereby cultivator shovels of both the forward and rear cultivator members may be made to follow the rows even if the tractor is inclined slightly diagonally of the rows, such as is necessary when operating on hillsides.

More specifically it is the object of my invention to provide a single transversely arranged bar or supporting frame adapted to be attached near the forward end of the tractor, and to provide means for supporting all of the cultivator shanks necessary for the simultaneous cultivation of three rows of plants, and to provide in connection therewith improved means for mounting the cultivator supporting bar or frame whereby the cultivator shovels will follow the contour of the ground surface at a comparatively uniform depth, and to provide in connection therewith hand actuated means whereby the suction of the cultivator shovels may be increased or decreased to meet the conditions presented by various kinds of soil.

My invention consists in the construction, arrangement and combination of the various parts of the device, whereby the objects contemplated are attained, as hereinafter more fully set forth, pointed out in my claims, and illustrated in the accompanying drawings, in which:

Figure 2 is a plan view of the same.

Figure 3 is a front elevation of a tractor showing my improved cultivator attachment applied thereto, the cultivator supporting bar being shown in solid lines to indicate its normal working condition, and in dotted lines to indicate its position when the tractor is operating on uneven ground surface.

Figure 4 is a detail sectional view taken on the line 4—4 of Figure 1.

Figure 5 is a detail sectional view taken on the line 5—5 of Figure 2.

Figure 6 is a detail sectional view taken on the line 6—6 of Figure 2.

Figure 1:
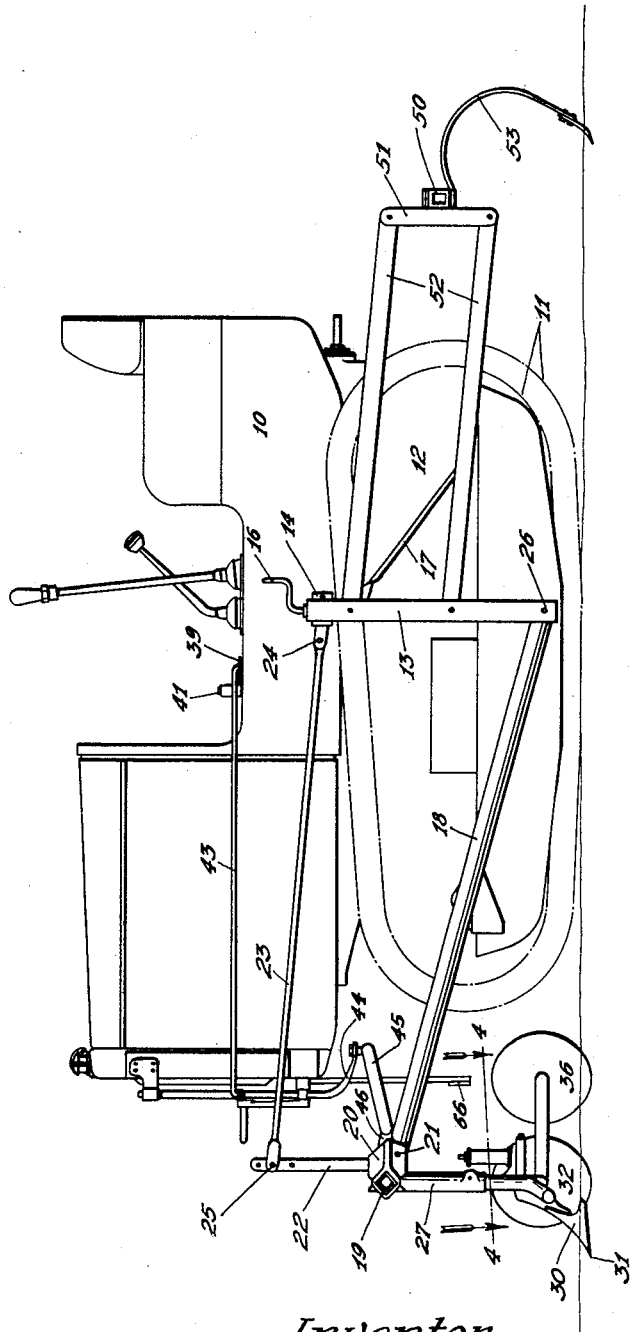
Figure 1 is a side elevation of a tractor showing the manner in which my improved cultivator attachment is applied thereto.

Referring to the accompanying drawings, I have used the numeral 10 to indicate generally a farm tractor of ordinary construction and of the type employing linked tread members, which are illustrated diagrammatically by the lines 11, and a frame 12 for supporting the treads, and which are of ordinary construction and form no part of this invention, other than to provide a suitable support for the cultivator attachment, which is adapted to also be used in connection with the wheel type of tractors.

Secured to each side of the frame 12 is a bracket bar 13, having its lower end terminating a slight distance above the ground surface and its upper end provided with a slidably mounted block 14, said block being caused to move upwardly and downwardly in a suitable slot 15, by means of a screw threaded crank 16. The bars 13 are permanently fixed to the tractor frame by means of braces 17, and other bracket members not shown. The bars 13 are supported preferably back of the center of the tractor or near its rear end.

Pivotally mounted to the lower end of each of the bars 13 is a forwardly extending and upwardly inclined link 18. The forward ends of the links 18 diverge outwardly, as clearly illustrated in Figure 2, and are designed to support a shank supporting bar 19 mounted horizontally and transversely in front of the tractor. The links 18 are pivotally connected to bracket members 20, by means of pivots 21, said brackets being rigidly secured to the bar 19.

Projecting upwardly from each of the bracket members 20 is what I shall term a rock arm 22. The upper end of each of the rock arms 22 is pivotally connected to a link 23, the rear end of which is pivotally connected to the forward end of one of the blocks 14, by means of a pivot member 24. The forward end of the link 23 is connected to the upper end of the arm 22, by means of a pivot 25. The link 18 is pivoted to the bracket 13 by means of a pivot 26. One of the shanks 27 and an adjacent rock arm 22 on the bar 19 function as a lever, and this term has been used in some of the claims.

The parts are so arranged that the distance between the pivot members 24 and 26 is greater than the distance between the pivot members 21 and 25. The distance between the pivot members 24 and 26 may be varied by means of the crank 16 before mentioned.

Fixed to the supporting bar 19 is a series of downwardly extending shanks 27, and also a series of downwardly extending shanks 28, and another series of downwardly extending shanks 29. The cultivator attachment herein described is adapted to cultivate three rows of plants. The shanks 27 are so located as to be supported midway between two adjacent rows being cultivated, while the shanks 28 are arranged in pairs and are adapted to straddle the rows of plants, while the shanks 29 are supported between the shanks 28 and the adjacent shanks 27. The lower end of each of the shanks 27 is provided with a shovel 30. The top surfaces of the shovels are inclined upwardly and rearwardly from the points 31, and are of ordinary construction.

Supported on the lower end of each of the shanks 28 is a disk 32. The disk of one shank of each pair of shanks is arranged opposite from the disk of the other shank of said pair, in the manner clearly illustrated in Figure 2. The disks are arranged to throw the soil outwardly as the cultivator is advanced.

The lower end of each of the shanks 29 is provided with a horizontally extending portion 33, which is designed to pivotally support a frame member 34, clearly illustrated in Figure 4. Said frame member is pivotally connected thereto by means of a bolt 35. The rear end of the frame 34 has a disk 36 pivotally mounted thereto and arranged to throw soil inwardly toward the rows, as illustrated in Figure 2.

The frame member 34 is pivotally mounted to permit the disk 36 to swing upwardly and downwardly relative to the lower end of the shank 29, to permit the disk to follow the contour of the ground surface.

The bar 19 is preferably formed in two sections, the end of one section being joined to the other by means of a pivot member 37 rotatively mounted in the inner end of one of the sections, and detachably secured to the adjacent end of the other section by means of suitable bolts 38. Other means for pivotally connecting these sections, however, may be provided. The pivot member 37 is simply for the purpose of permitting one end of the bar 19 to slightly rotate relative to the adjacent bar about its longitudinal axis, the purpose of which will hereinafter be made clear.

The links 18 and 23 are pivotally connected to the members 13 and 22 in such manner as to permit the bar 19 to move freely transversely of the line of movement of the tractor, thus providing means whereby the bar may be moved transversely to follow the plants of crooked rows.

For moving said bar 19 transversely, I have provided a lever 39 pivotally connected to the platform 40 of the tractor by means of a pivot 41. Said bar is arranged transversely of the platform and so located that it may be moved by the operator's feet while the operator is sitting in the seat 42.

One end of the bar 39 is provided with a link 43, having its forward end pivotally connected to a bell crank lever 44. The rearwardly extending portion of the lever 44 is pivotally connected to a link 45, the outer end of which is pivotally connected to a bracket 46 secured near one end of the bar 19.

The opposite end of the lever 39 is provided with a link 47, the rear end of which is pivotally connected to a bell crank lever 48, which in turn is pivotally connected to an outwardly extending link 49 attached to one end of a bar 50 supported transversely of the rear end of the tractor. Said bar 50 has vertically arranged rock arms 51 pivotally connected to parallel links 52. The forward ends of the links 52 are pivotally connected to the corresponding bracket member 13, in the manner illustrated in Figures 1 and 2. The bar 50 is provided with a series of spring teeth 53 of ordinary construction.

To limit the downward movement of the bar 19 below a predetermined depth, I have provided a bracket 65 carried by the tractor frame and having at each end a hook 66, said hook being designed to support the links 18.

By this arrangement it will be seen that the bar 50 is free to swing upwardly and downwardly, and also transversely.

It will further be seen that by the link arrangement above described, if the bar 39 is oscillated in a clockwise direction, as illustrated in Figure 2, the link 47 will be moved rearwardly, causing the member 50 to be moved to the right, while the link 43 will be moved forwardly, causing the bar 19 to be moved to the left, thus providing means whereby the tendency of the bar 19 to move downwardly on a hillside will be counterbalanced by the weight of the bar 50, so that the steering of the bar 19 may be easily accomplished.

A further advantage is gained with this construction in that when the tractor is moving transversely of the inclination of a hill, at times the forward end of the tractor must be slanted up hill slightly to prevent the tractor from gradually working down hill, on account of a certain amount of slippage between the treads of the tractor and the ground surface.

By causing the bars to swing in opposite directions, it will readily be seen that the cultivator shovels of the bar 19 may be properly adjusted relative to the row, and at the same time maintain the cultivator teeth 53 in proper operative positions, even if the tractor is being operated slightly inclined to the rows.

It will readily be seen from the description of the link devices 23 and 18 that the cultivator elements 30 and 32 may be readily moved upwardly and downwardly so that the said shovels may be permitted to follow the longitudinal contour of the ground surface. The points 31 of the shovels 30 enter the ground surface at a predetermined depth.

It will further be seen that power is transmitted to the points 31 through the shanks 27, the bar 19 and the links 18 and 23. The power to advance the shovels or tools 30 and 32 is transmitted through the links 18 and the pivot members 26.

Figure 7:
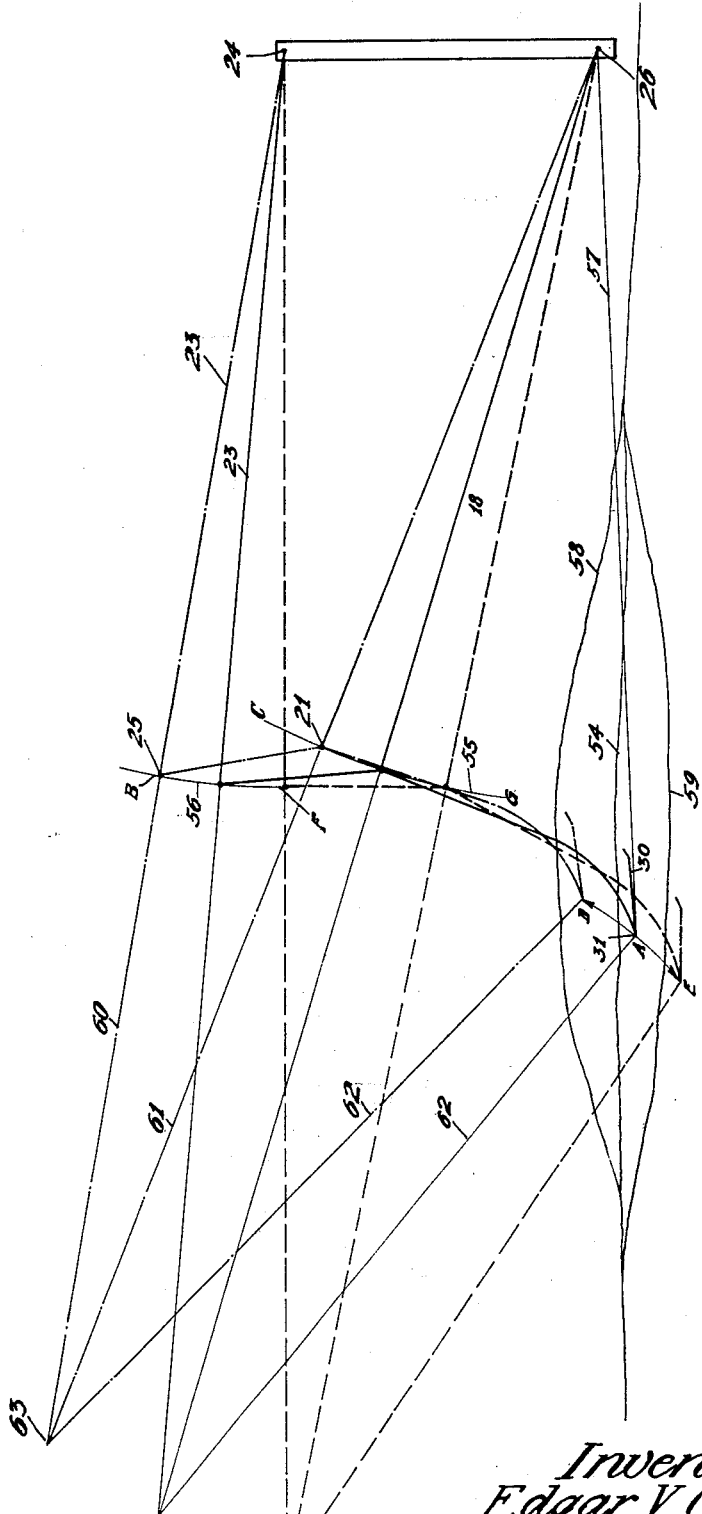
Figure 7 is a diagrammatical view showing the cultivator shovels at various operative positions.

The operation of the device, whereby the cultivator tools are automatically maintained substantially at a given depth regardless of whether or not the shovels are operating over a ridge or in a ditch or dead furrow, may be best explained by reference to Figure 7, in which the numeral 54 indicates the normal ground surface, with the lower end of the shovel located at A and at a normal working depth.

It will readily be seen that resistance will be offered to any forward advance of the shovel. This resistance is overcome by force applied to the pivot members 26, the power acting in a line parallel with the ground surface. Under these conditions, the arm 22 and the shank 27 act together to form a lever, with the pivot center 25 as a fulcrum, force being applied to the pivot 21 through the link 18 produces tensile strain in the link 23.

If forward pressure is applied to the pivot 26, and the point of the shovel is supported against forward movement, then the pivot member 21 will move upwardly through the arc 55 and the pivot center 25 upwardly through the arc 56, until the said pivot centers 21 and 25 assume the positions C and B as indicated by dotted lines. The point 31 of the shovel will then be pulled upwardly and rearwardly to the point D, or if the resistance against the point 31 is less than the power applied at the point 26, then said point 31 will move downwardly to the point E, due to the weight of the shovel and the bar 19, causing the pivot members 25 and 21 to assume the points F and G. Thus it will be seen that the point of the shovel 30 will move through an upwardly and rearwardly inclined path between the points E and D.

From this description it will further be seen that if the shovel is moved downwardly from the normal working position A to the point E, it will be positioned ahead of the point A, while if the shovel moves upwardly from the point A to the point D, it will be positioned back of the point A.

By this arrangement it will be seen that any upward and downward movement of the forward ends of the links 23 and 18 will cause the shovel member 30 to be elevated and lowered, and also moved forwardly and rearwardly. The amount of forward and rearward movement relative to a given up and down movement, determining to a large extent the amount of lifting force, may be varied by either changing the distance between the pivot members 21 and 25 or between the pivot members 24 and 26, or by increasing or decreasing the length of the link 23.

In the drawings I have illustrated the crank 16 for the purpose of increasing or decreasing the distance between the pivot members 24 and 26, for the purpose of varying the suction of the shovels 30 or their tendency to enter the ground surface.

From the description of the link mechanism, it would appear that any head-on resistance offered to the shovel 30 will tend to cause the shovel to be moved out of the ground, so that no useful work may be performed. However, this elevating tendency is partially overcome by the weight of the bar 19, the shovel supporting shanks and the line members.

It will further be seen that if the links 18 and the shank 27 were considered as a rigid frame member, with the link 23 omitted, and if power were applied to the point 26, then the tendency of the shovel 30 would be to be moved downwardly into the ground along the line 57. This natural tendency of the shovels to enter the soil on the line 57 I shall term, for convenience, inherent suction.

On account of the pivot center 26 being supported near the ground surface, it will be seen that the line 57 assumes a position nearly parallel with the line 54. The tendency of the shovel to enter the ground surface decreases as the line 57 is brought into parallelism with the line 54, or vice versa, so that on account of the location of the pivot 26, the shovel 30 has a natural tendency to move into the ground surface. The tendency of the shovels to enter the soil, due to their inherent suction, their weight, and their suction due to the shape of the shovel, is counterbalanced by the leverage of the shanks and link arrangement above described, resulting in the shovels maintaining a comparatively uniform depth even over quite uneven ground surface.

Assuming that the shovel is positioned at the point A, and that the tractor is being advanced over the ground surface, and that the shovel is being moved through the soil at its normal working depth, and that the shovel 30 approaches an elevated portion 58, then it will readily be seen that it will naturally tend to enter the portion 58 on a line parallel with the line 54.

It will further be seen that as the shovel enters the portion 58, its depth will be increased and consequently its head-on resistance increased, causing the shovel to move rearwardly at a speed less than the advance speed of the tractor, causing the shovel to be elevated by its leverage over its inherent suction and its weight, permitting the point 31 of the shovel to travel at a comparatively uniform depth as it travels over the raised portion 58. On the other hand, if a depressed surface 59 is encountered, then the point 31 of the shovel will move near the downwardly and forwardly inclined surface to lessen the head-on resistance. The weight of the shovels cause the points to then move downwardly through a line substantially parallel with the line 59.

In this connection, however, it should be noted that the point of the shovel will move forwardly and at a higher speed than the advance of the tractor, so that the head-on resistance of the shovel is increased over its normal resistance, so that any tendency of the shovel to move downwardly to an excessive depth will be overcome.

By this arrangement it will be seen that the working depth of the shovel may be constantly maintained regardless of whether or not the shovel is operating in an elevated or lowered position relative to its normal working position as compared with the base line of the tractor tread.

In this respect my improved cultivator attachment is of great advantage over the ordinary cultivator employing a horizontal beam pivoted at its forward end, and having a downwardly extending shank operatively connected to the rear end of the beam, in which the pivot center of the shank is operated at a uniform distance from the ground surface. With this construction, if the shovels engage a raised portion, such as the portion 58, then the suction of the shovels will be increased as they are moved upwardly or decreased as they are moved downwardly passing through a depression. In one case the shovels operate too deep, while in the other case they operate too shallow.

With my improved cultivator construction, the suction of the shovel is comparatively uniform, regardless of whether the shovel is above or below its normal working plane, in such a manner that without the use of springs for retaining the shovels in the ground, as has heretofore been necessary with ordinary cultivator constructions. The weight of the shovels and the balanced suction condition permit the shovels to operate at a uniform depth.

By providing the crank 16, I have provided means whereby the suction of the shovel 30 may be increased or decreased, by causing the shovel to swing forwardly or rearwardly a greater or less distance compared with the given up and down movement of the bar 19, to meet various soil conditions.

On account of the bar 19 being carried by the forward ends of the links 23 and 18, it will readily be seen that the ends of the bars are free to swing upwardly and downwardly, one above the other, so that the cultivator tools may operate in a line substantially parallel with the general transverse profile of the ground.

The operation of the shovels to maintain a constant uniform depth might be considered in another manner and illustrated by extending the link 23 in the dotted line 60 and the link 18 in the dotted line 61, and drawing a dotted line 62 from the intersecting point 63 of the lines 60 and 61 to the point 31 of the shovel 30, which would represent the resultant force line of the shovel as it passes through the ground surface with a slight tendency to move out of the ground on the line 62, as the shovel is advanced forwardly the point 63 representing the focals of the forces imparted to the tools by the frame. By plotting the shovel as being in positions A, E and D, it will be seen that the lines 62 of all three positions are substantially parallel. Said line 62 represents the suction of the shovel in its various elevated positions.

In Figure 3 the bar 19 and the shovels are illustrated by dotted lines as being operated on a hillside. It will be seen that on account of one end of the bar being elevated higher, than the other, as shown by dotted lines, a slight rotary movement of one end of the bar will be imparted relative to the opposite end. For this reason, the pivot member 37 has been provided midway between the ends of the bar, so that the two halves may operate independently to eliminate excessive torsional strain on the bar.

Thus it will be seen that I have provided a cultivator attachment which may be easily applied to the ordinary tractor, and which is of comparatively simple construction, and of about half the weight of the cultivator attachments heretofore used in connection with and carried by a tractor, and in which the working depth of the shovels or cultivator tools is automatically regulated, and thus eliminating a large amount of constant care and labor on the part of the operator, and at the same time provides means whereby better and more uniform cultivation of the soil is accomplished.

It will further be seen that I have provided in connection with a cultivator attachment for tractors, having a transversely swinging cultivator supporting member, improved means for counterbalancing the swinging action of the cultivator element.

In the drawings I have illustrated this counterbalancing element as a bar having a series of weeder teeth. However, it will readily be seen that other forms of farm implements may be substituted, such as harrows or planters, or if it is not desirable to employ a cultivating element, then a weight may be substituted in place of the bar 50.

In the drawings, I have illustrated a combination of shovels and disks. It will readily be seen that the device is adapted to be used with either the combination of the two forms of cultivators or with other tools.

I claim as my invention:

1. A cultivator comprising in combination a movable supporting frame, a horizontally arranged shank supporting bar supported transversely of the movement of said supporting frame, a series of cultivator shanks fixed to and depending from said bar, a cultivator tool on the lower end of each of said shanks, means for supporting said bar to move freely up and down, and to permit slight rotary movement to cause the cultivator tools to move rearwardly as the bar is moved upwardly, and forwardly as the bar is moved downwardly, whereby the head-on resistance offered to the tools as they enter and are advanced through the ground surface will cause the tools to tend to move upwardly and rearwardly of the advance of the movable support and out of the ground, the weight of the bar and shanks tending to move the tools forwardly and downwardly to maintain a substantially uniform suction of the tools as the cultivator is advanced, regardless of whether or not the tools are in an elevated or lowered position relative to their normal advance line of movement.

2. A cultivator comprising in combination a movable supporting frame, a horizontally arranged shank supporting bar supported transversely of the movement of said supporting frame, a series of cultivator shanks fixed to and depending from said bar, a cultivator tool on the lower end of each of said shanks, means for supporting said bar to move freely up and down, and to permit slight rotary movement to cause the cultivator tools to move rearwardly as the bar is moved upwardly, and forwardly as the bar is moved downwardly, whereby the head-on resistance offered to the tools as they enter and are advanced through the ground surface will cause the tools to tend to move upwardly and rearwardly of the advance of the movable support and out of the ground, the weight of the bar and shanks tending to move the tools forwardly and downwardly to maintain a substantially uniform suction of the tools as the cultivator is advanced, regardless of whether or not the tools are in an elevated or lowered position relative to their normal advance line of movement, and means for varying the amount of forward and rearward movement of said tools to a given amount of up and down movement of said bar.

3. A cultivator comprising in combination a movable supporting frame, a horizontally arranged shank supporting bar supported transversely of the movement of said supporting frame, a series of cultivator shanks fixed to and depending from said bar, a cultivator tool on the lower end of each shank, upright rock arms secured to said bar, a pair of downwardly and rear-shovels 30 enter the ground surface at a predetermined depth.

It will further be seen that power is transmitted to the points 31 through the shanks 27, the bar 19 and the links 18 and 23. The power to advance the shovels or tools 30 and 32 is transmitted through the links 18 and the pivot members 26.

The operation of the device, whereby the cultivator tools are automatically maintained substantially at a given depth regardless of whether or not the shovels are operating over a ridge or in a ditch or dead furrow, may be best explained by reference to Figure 7, in which the numeral 54 indicates the normal ground surface, with the lower end of the shovel located at A and at a normal working depth.

It will readily be seen that resistance will be offered to any forward advance of the shovel. This resistance is overcome by force applied to the pivot members 26, the power acting in a line parallel with the ground surface. Under these conditions, the arm 22 and the shank 27 act together to form a lever, with the pivot center 25 as a fulcrum, force being applied to the pivot 21 through the link 18 produces tensile strain in the link 23.

If forward pressure is applied to the pivot 26, and the point of the shovel is supported against forward movement, then the pivot member 21 will move upwardly through the arc 55 and the pivot center 25 upwardly through the arc 56, until the said pivot centers 21 and 25 assume the positions C and B as indicated by dotted lines. The point 31 of the shovel will then be pulled upwardly and rearwardly to the point D, or if the resistance against the point 31 is less than the power applied at the point 26, then said point 31 will move downwardly to the point E, due to the weight of the shovel and the bar 19, causing the pivot members 25 and 21 to assume the points F and G. Thus it will be seen that the point of the shovel 30 will move through an upwardly and rearwardly inclined path between the points E and D.

From this description it will further be seen that if the shovel is moved downwardly from the normal working position A to the point E, it will be positioned ahead of the point A, while if the shovel moves upwardly from the point A to the point D, it will be positioned back of the point A.

By this arrangement it will be seen that any upward and downward movement of the forward ends of the links 23 and 18 will cause the shovel member 30 to be elevated and lowered, and also moved forwardly and rearwardly. The amount of forward and rearward movement relative to a given up and down movement, determining to a large extent the amount of lifting force, may be varied by either changing the distance between the pivot members 21 and 25 or between the pivot members 24 and 26, or by increasing or decreasing the length of the link 23.

In the drawings I have illustrated the crank 16 for the purpose of increasing or decreasing the distance between the pivot members 24 and 26, for the purpose of varying the suction of the shovels 30 or their tendency to enter the ground surface.

From the description of the link mechanism, it would appear that any head-on resistance offered to the shovel 30 will tend to cause the shovel to be moved out of the ground, so that no useful work may be performed. However, this elevating tendency is partially overcome by the weight of the bar 19, the shovel supporting shanks and the line members.

It will further be seen that if the links 18 and the shank 27 were considered as a rigid frame member, with the link 23 omitted, and if power were applied to the point 26, then the tendency of the shovel 30 would be to be moved downwardly into the ground along the line 57. This natural tendency of the shovels to enter the soil on the line 57 I shall term, for convenience, inherent suction.

On account of the pivot center 26 being supported near the ground surface, it will be seen that the line 57 assumes a position nearly parallel with the line 54. The tendency of the shovel to enter the ground surface decreases as the line 57 is brought into parallelism with the line 54, or vice versa, so that on account of the location of the pivot 26, the shovel 30 has a natural tendency to move into the ground surface. The tendency of the shovels to enter the soil, due to their inherent suction, their weight, and their suction due to the shape of the shovel, is counterbalanced by the leverage of the shanks and link arrangement above described, resulting in the shovels maintaining a comparatively uniform depth even over quite uneven ground surface.

Assuming that the shovel is positioned at the point A, and that the tractor is being advanced over the ground surface, and that the shovel is being moved through the soil at its normal working depth, and that the shovel 30 approaches an elevated portion 58, then it will readily be seen that it will naturally tend to enter the portion 58 on a line parallel with the line 54.

It will further be seen that as the shovel enters the portion 58, its depth will be increased and consequently its head-on resistance increased, causing the shovel to move rearwardly at a speed less than the advance speed of the tractor, causing the shovel to be elevated by its leverage over its inherent suction and its weight, permitting the point 31 of the shovel to travel at a comparatively uniform depth as it travels over the raised portion 58. On the other hand, if a depressed surface 59 is encountered, then the point 31 of the shovel will move near the downwardly and forwardly inclined surface to lessen the head-on resistance. The weight of the shovels cause the points to then move downwardly through a line substantially parallel with the line 59.

In this connection, however, it should be noted that the point of the shovel will move forwardly and at a higher speed than the advance of the tractor, so that the head-on resistance of the shovel is increased over its normal resistance, so that any tendency of the shovel to move downwardly to an excessive depth will be overcome.

By this arrangement it will be seen that the working depth of the shovel may be constantly maintained regardless of whether or not the shovel is operating in an elevated or lowered position relative to its normal working position as compared with the base line of the tractor tread.

In this respect my improved cultivator attachment is of great advantage over the ordinary cultivator employing a horizontal beam pivoted at its forward end, and having a downwardly extending shank operatively connected to the rear end of the beam, in which the pivot center of the shank is operated at a uniform distance from the ground surface. With this construction, if the shovels engage a raised portion, such as the portion 58, then the suction of the shovels will be increased as they are moved upwardly or decreased as they are moved downwardly passing through a depression. In one case the shovels operate too deep, while in the other case they operate too shallow.

With my improved cultivator construction, the suction of the shovel is comparatively uniform, regardless of whether the shovel is above or below its normal working plane, in such a manner that without the use of springs for retaining the shovels in the ground, as has heretofore been necessary with ordinary cultivator constructions. The weight of the shovels and the balanced suction condition permit the shovels to operate at a uniform depth.

By providing the crank 16, I have provided means whereby the suction of the shovel 30 may be increased or decreased, by causing the shovel to swing forwardly or rearwardly a greater or less distance compared with the given up and down movement of the bar 19, to meet various soil conditions.

On account of the bar 19 being carried by the forward ends of the links 23 and 18, it will readily be seen that the ends of the bars are free to swing upwardly and downwardly, one above the other, so that the cultivator tools may operate in a line substantially parallel with the general transverse profile of the ground.

The operation of the shovels to maintain a constant uniform depth might be considered in another manner and illustrated by extending the link 23 in the dotted line 60 and the link 18 in the dotted line 61, and drawing a dotted line 62 from the intersecting point 63 of the lines 60 and 61 to the point 31 of the shovel 30, which would represent the resultant force line of the shovel as it passes through the ground surface with a slight tendency to move out of the ground on the line 62, as the shovel is advanced forwardly the point 63 representing the focals of the forces imparted to the tools by the frame. By plotting the shovel as being in positions A, E and D, it will be seen that the lines 62 of all three positions are substantially parallel. Said line 62 represents the suction of the shovel in its various elevated positions.

In Figure 3 the bar 19 and the shovels are illustrated by dotted lines as being operated on a hillside. It will be seen that on account of one end of the bar being elevated higher, than the other, as shown by dotted lines, a slight rotary movement of one end of the bar will be imparted relative to the opposite end. For this reason, the pivot member 37 has been provided midway between the ends of the bar, so that the two halves may operate independently to eliminate excessive torsional strain on the bar.

Thus it will be seen that I have provided a cultivator attachment which may be easily applied to the ordinary tractor, and which is of comparatively simple construction, and of about half the weight of the cultivator attachments heretofore used in connection with and carried by a tractor, and in which the working depth of the shovels or cultivator tools is automatically regulated, and thus eliminating a large amount of constant care and labor on the part of the operator, and at the same time provides means whereby better and more uniform cultivation of the soil is accomplished.

It will further be seen that I have provided in connection with a cultivator attachment for tractors, having a transversely swinging cultivator supporting member, improved means for counterbalancing the swinging action of the cultivator element.

In the drawings I have illustrated this counterbalancing element as a bar having a series of weeder teeth. However, it will readily be seen that other forms of farm implements may be substituted, such as harrows or planters, or if it is not desirable to employ a cultivating element, then a weight may be substituted in place of the bar 50.

In the drawings, I have illustrated a combination of shovels and disks. It will readily be seen that the device is adapted to be used with either the combination of the two forms of cultivators or with other tools.

I claim as my invention:

1. A cultivator comprising in combination a movable supporting frame, a horizontally arranged shank supporting bar supported transversely of the movement of said supporting frame, a series of cultivator shanks fixed to and depending from said bar, a cultivator tool on the lower end of each of said shanks, means for supporting said bar to move freely up and down, and to permit slight rotary movement to cause the cultivator tools to move rearwardly as the bar is moved upwardly, and forwardly as the bar is moved downwardly, whereby the head-on resistance offered to the tools as they enter and are advanced through the ground surface will cause the tools to tend to move upwardly and rearwardly of the advance of the movable support and out of the ground, the weight of the bar and shanks tending to move the tools forwardly and downwardly to maintain a substantially uniform suction of the tools as the cultivator is advanced, regardless of whether or not the tools are in an elevated or lowered position relative to their normal advance line of movement.

2. A cultivator comprising in combination a movable supporting frame, a horizontally arranged shank supporting bar supported transversely of the movement of said supporting frame, a series of cultivator shanks fixed to and depending from said bar, a cultivator tool on the lower end of each of said shanks, means for supporting said bar to move freely up and down, and to permit slight rotary movement to cause the cultivator tools to move rearwardly as the bar is moved upwardly, and forwardly as the bar is moved downwardly, whereby the head-on resistance offered to the tools as they enter and are advanced through the ground surface will cause the tools to tend to move upwardly and rearwardly of the advance of the movable support and out of the ground, the weight of the bar and shanks tending to move the tools forwardly and downwardly to maintain a substantially uniform suction of the tools as the cultivator is advanced, regardless of whether or not the tools are in an elevated or lowered position relative to their normal advance line of movement, and means for varying the amount of forward and rearward movement of said tools to a given amount of up and down movement of said bar.

3. A cultivator comprising in combination a movable supporting frame, a horizontally arranged shank supporting bar supported transversely of the movement of said supporting frame, a series of cultivator shanks fixed to and depending from said bar, a cultivator tool on the lower end of each shank, upright rock arms secured to said bar, a pair of downwardly and rearwardly extending links pivoted to each rock arm, the rear ends of said links being connected to said movable member whereby up and down movement of said bar will cause the cultivator tools to be moved rearwardly and forwardly, for the purposes stated.

4. A cultivator comprising in combination a movable supporting frame, a horizontally arranged shank supporting bar supported transversely of the movement of said supporting frame, a series of cultivator shanks fixed to and depending from said bar, a cultivator tool on the lower end of each shank, upright rock arms secured to said bar, a pair of downwardly and rearwardly extending links pivoted to each rock arm, the rear ends of said links being connected to said movable member, said bar and said links being pivoted to permit transverse movement of said bar, a counterbalancing device supported on the opposite end of said frame from said shank supporting bar to swing transversely of the movement of said supporting frame, and link mechanism operatively connecting said bar and said counterbalance to cause the bar and counterbalance to move in opposite directions.

5. A cultivator comprising in combination a movable supporting frame, a horizontally arranged shank supporting bar supported transversely of the movement of said supporting frame, a series of cultivator shanks fixed to and depending from said bar, a cultivator tool on the lower end of each shank, upright rock arms secured to said bar, a pair of downwardly and rearwardly extending links pivoted to each rock arm, the rear ends of said links being connected to said movable member, said bar and said links being pivoted to permit transverse movement of said bar, a counterbalancing device supported on the opposite end of said frame from said shank supporting bar to swing transversely of the movement of said supporting frame, link mechanism operatively connecting said bar and said counterbalance to cause the bar and counterbalance to move in opposite directions, and manually operated means for swinging said bars transversely.

6. A cultivator comprising in combination a movable supporting frame, a horizontally arranged shank supporting bar supported transversely of the movement of said support and near its forward end, a series of cultivator shanks fixed to and depending from said bar, a cultivator tool on the lower end of each shank, vertically arranged rock arms on said bar, and a pair of downwardly and rearwardly extending links pivoted to each rock arm having their rear ends pivoted near the rear end of said movable support and with the pivot of the lower link near the ground surface.

7. A cultivator comprising in combination a movable supporting frame, a vertically arranged shank, a cultivator tool on the lower end of said shank, a pair of substantially parallel and downwardly and rearwardly inclined links pivotally connected to the upper end of said shank, and means for pivoting the rear ends of said shanks to said support with the lower one of the last said pivots being near the ground surface.

8. The combination of a tractor, a shovel supporting bar arranged transversely of the movement of said tractor, a series of vertical shanks attached thereto, a cultivator tool on the lower end of each shank, rock arms projecting upwardly from said bar, a pair of downwardly and rearwardly inclined links pivoted to each lever, means for pivotally connecting the rear ends of each set of links to the opposite sides of said tractor, the forward ends of said links diverging outwardly to permit said bar to swing transversely, and means for swinging said bar transversely.

9. The combination of a tractor, a shovel supporting bar arranged transversely of the movement of said tractor, a series of vertically arranged shanks attached to and depending therefrom, a cultivator tool on the lower end of each shank, vertical rock arms attached to said bar, a pair of downwardly and rearwardly inclined links pivoted to each arm, means for pivotally connecting the rear ends of each set of links to said tractor frame, and means for varying the distance between two corresponding pivot members whereby the amount of forwardly and rearwardly swinging movement of the cultivator tools may be varied compared to a given up and down movement of said bar.

10. A cultivator comprising in combination a movable supporting frame, a cultivator element mounted ahead of said supporting frame and adapted to swing transversely of the movement of said support. A cultivator element supported back of said supporting frame and also mounted to move transversely of the movement of said support, and means operatively connecting said cultivator elements whereby transverse movement of one element in one direction will cause the other cultivator element to move in the opposite direction.

11. A cultivator comprising in combination a movable supporting frame, a horizontally and transversely arranged bar, means for mounting said bar to move upwardly and downwardly, a series of downwardly extending shanks attached to said bar, a cultivator shovel attached to some of said shanks, a disk pivotally connected to other ones of said shanks, a rearwardly extending disk supporting frame pivotally connected to the lower ends of a third set of downwardly extending shanks, and a disk on the rear end of each of said pivotally connected disk supporting frames.

12. An attachment for vehicles comprising a substantially upright lever, a tool at its lower end, means for movably supporting the fulcrum point of the lever to travel in a path inclined upwardly and rearwardly relative to the line of advance of the vehicle, and means for movably supporting the upper portion of the lever to travel in a path approximately vertical.

EDGAR V. COLLINS